(12) United States Patent
Mukae

(10) Patent No.: US 12,043,417 B2
(45) Date of Patent: Jul. 23, 2024

(54) SATELLITE CONSTELLATION FORMING SYSTEM, SATELLITE CONSTELLATION FORMING METHOD, SATELLITE CONSTELLATION, AND GROUND FACILITY

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 286 days.

(21) Appl. No.: 17/605,578

(22) PCT Filed: Jun. 17, 2020

(86) PCT No.: PCT/JP2020/023820
§ 371 (c)(1),
(2) Date: Oct. 22, 2021

(87) PCT Pub. No.: WO2020/256024
PCT Pub. Date: Dec. 24, 2020

(65) Prior Publication Data
US 2022/0250772 A1    Aug. 11, 2022

(30) Foreign Application Priority Data
Jun. 19, 2019    (WO) .................. PCT/JP2019/024378

(51) Int. Cl.
*B64G 1/24*    (2006.01)
*B64G 1/10*    (2006.01)

(52) U.S. Cl.
CPC ........... *B64G 1/242* (2013.01); *B64G 1/1085* (2013.01)

(58) Field of Classification Search
CPC ............................. B64G 1/242; B64G 1/1085
See application file for complete search history.

(56) References Cited

U.S. PATENT DOCUMENTS

| 5,433,726 A | * | 7/1995 | Horstein | .............. B64G 1/1007 455/12.1 |
| 5,813,634 A | | 9/1998 | Pizzicaroli et al. | |
| (Continued) | | | | |

FOREIGN PATENT DOCUMENTS

JP    2017-114159 A    6/2017

OTHER PUBLICATIONS

International Search Report and Written Opinion mailed on Sep. 8, 2020, received for PCT Application PCT/JP2020/023820, Filed on Jun. 17, 2020, 9 pages including English Translation.
(Continued)

*Primary Examiner* — Seth A Silverman
(74) *Attorney, Agent, or Firm* — XSENSUS LLP

(57) ABSTRACT

A satellite constellation forming system forms a satellite constellation (20) having N orbital planes (21) (N being a natural number) with mutually different normal directions. A satellite constellation forming unit forms the satellite constellation (20) in which each orbital plane (21) of the N orbital planes is an elliptical orbit with the same eccentricity and the same major axis. In the satellite constellation (20), an elevation angle of a major axis of each orbital plane (21) of the N orbital planes has a relative angle of 360/N degrees with respect to each other. In the satellite constellation (20), an azimuth direction of each orbital plane (21) of the N orbital planes has a relative angle of 180/N degrees with respect to each other.

16 Claims, 13 Drawing Sheets

(56) References Cited

U.S. PATENT DOCUMENTS

| | | | | |
|---|---|---|---|---|
| 5,957,409 | A | * | 9/1999 | Castiel ............ H04B 7/19 |
| | | | | 455/12.1 |
| 2002/0136191 | A1 | * | 9/2002 | Draim ............ B64G 1/1085 |
| | | | | 370/344 |
| 2015/0197350 | A1 | | 7/2015 | Ho |
| 2017/0247123 | A1 | * | 8/2017 | Turner ............ B64G 1/242 |
| 2018/0022474 | A1 | | 1/2018 | Meek |
| 2018/0370658 | A1 | | 12/2018 | Amimoto et al. |
| 2019/0313271 | A1 | * | 10/2019 | Yiu ............ H04W 72/04 |

OTHER PUBLICATIONS

International Search Report and Written Opinion mailed on Sep. 17, 2019, received for PCT Application PCT/JP2019/024378, Filed on Jun. 19, 2019, 9 pages including English Translation.
Reiland et al., "Assessing and Minimizing Collisions in Satellite Mega-Constellations", Advanced Maui Optical and Space Surveillance Technologies Conference (AMOS), 2019, 13 pages.

* cited by examiner

SATELLITE CONSTELLATION FORMING SYSTEM, SATELLITE CONSTELLATION FORMING METHOD, SATELLITE CONSTELLATION, AND GROUND FACILITY

CROSS-REFERENCE TO RELATED APPLICATIONS

The present application is based on PCT filing PCT/JP2020/023820, filed Jun. 17, 2020, which claims priority to JP PCT/JP2019/024378, filed Jun. 19, 2019, the entire contents of each are incorporated herein by reference.

TECHNICAL FIELD

The present invention relates to a satellite constellation forming system, a satellite constellation forming method, a satellite constellation, and a ground facility. In particular, the present invention relates to a satellite constellation forming system, a satellite constellation forming method, a satellite constellation, and a ground facility for avoiding a risk of a collision between satellites in elliptical orbits.

BACKGROUND ART

In recent years, a large-scale satellite constellation of several hundred to several thousand satellites has been proposed. In space traffic management (STM), there is an increasing need to create international rules for avoiding a risk of a collision due to coexistence of a plurality of satellite constellations.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

When it is assumed that a predetermined mid-latitude to high-latitude area on Earth is to be observed continuously in a predetermined time period, a large number of satellites are required in a low Earth orbit (LEO) or a medium Earth orbit (MEO), which is the orbit of a typical observation satellite system. When a geostationary orbit (GEO) is used, a problem is that observation conditions such as a resolution and an observation elevation angle are not good. When a Molniya orbit is used, a problem is that a decrease in resolution occurs at the apogee, or that there are times with favorable observation conditions and times with unfavorable observation conditions throughout the year.

It is an object of the present invention to avoid, in a satellite constellation, a risk of a collision in the satellite constellation having a plurality of elliptical orbits.

Solution to Problem

A satellite constellation forming system according to the present invention forms a satellite constellation having N orbital planes (N being a natural number) with mutually different normal directions, and the satellite constellation forming system includes a satellite constellation forming unit to form the satellite constellation in which each orbital plane of the N orbital planes is an elliptical orbit with a same eccentricity and a same major axis, an elevation direction of a major axis of each orbital plane of the N orbital planes has a relative angle of 360/N degrees with respect to each other, and an azimuth direction of each orbital plane of the N orbital planes has a relative angle of 180/N degrees with respect to each other.

Advantageous Effects of Invention

In a satellite constellation forming system according to the present invention, a satellite constellation forming unit forms a satellite constellation in which each orbital plane of N orbital planes is an elliptical orbit having the same eccentricity and the same major axis. Furthermore, the satellite constellation forming unit forms the satellite constellation in which an elevation direction of a major axis of each orbital plane of the N orbital planes has a relative angle of 360/N degrees with respect to each other, and an azimuth direction of each orbital plane of the orbital planes has a relative angle of 180/N degrees with respect to each other. Therefore, with the satellite constellation forming system according to the present invention, there is an effect that a risk of a collision in a plurality of elliptical orbits can be avoided.

DESCRIPTION OF EMBODIMENTS

Figure 1:
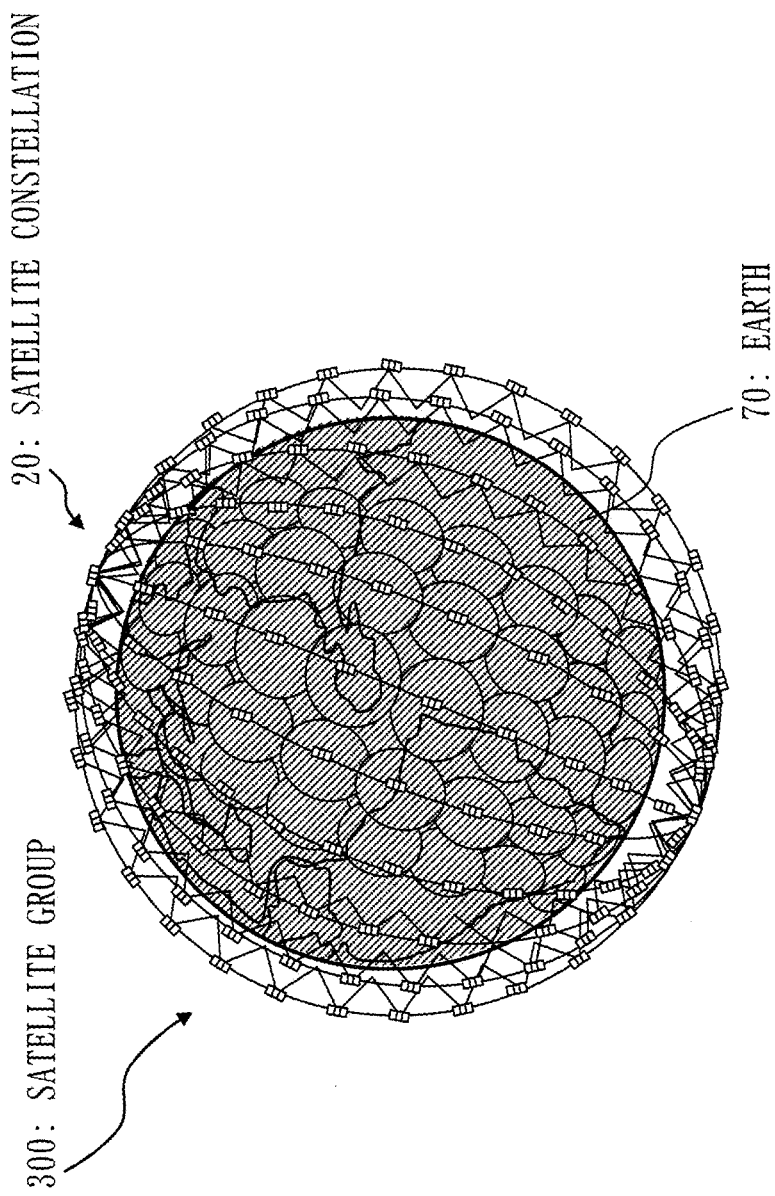
FIG. 1 is an example in which a plurality of satellites cooperatively realize a communication service to the ground over the entire globe of Earth.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner.

However, a communication service can be provided with a single orbital plane only to an area directly below the orbit of satellites. Thus, another orbital plane rotated in the east-west direction with respect to Earth is placed adjacently, and a communication service is concurrently provided by a plurality of satellites in this orbital plane. By providing adjacent orbital planes in this way, communication services can be provided to the ground with widespread coverage across the adjacent orbits. Similarly, by placing a large number of orbital planes at approximately equal intervals around Earth, a communication service to the ground can be provided over the entire globe. When seen from a specific point on the ground, each satellite flies away in a short period of time. However, if satellites in orbit provide a communication service in turn in a time-division manner, a communication service can be provided continuously to any point on the ground. In this case, in order to share the communication service with a following satellite, each satellite provides and accepts necessary signals and information, using an inter-satellite communication method.

When a communication service is realized by a satellite constellation orbiting in low Earth orbit, the service areas of all satellites cover the entire globe, and a communication service for any given ground user is shared and continued by satellites flying above the user in turn while passing on signals and information. As a result, the communication service can be provided continuously to the ground user. By providing each satellite with the communication function between the satellite and the ground and also the inter-satellite communication function, signals and information can be transferred between satellites orbiting in proximity to each other. The transfer of signals and information that contributes to cooperation in a communication service mission will hereinafter be referred to as handover.

In a satellite constellation, it is generally arranged that different orbital planes all have the same orbital altitude. Since the ground speeds of satellites flying at the same orbital altitude are similar, the ground service ranges move according to the ground speeds of the satellites with the relative positional relationship of the service ranges of the individual satellites being maintained. If the service ranges of successive satellites in the same orbital plane or the service ranges of satellites in adjacent orbital planes exhaustively cover the ground surface, the service range will always be maintained when seen from any given point on the ground.

Figure 2:
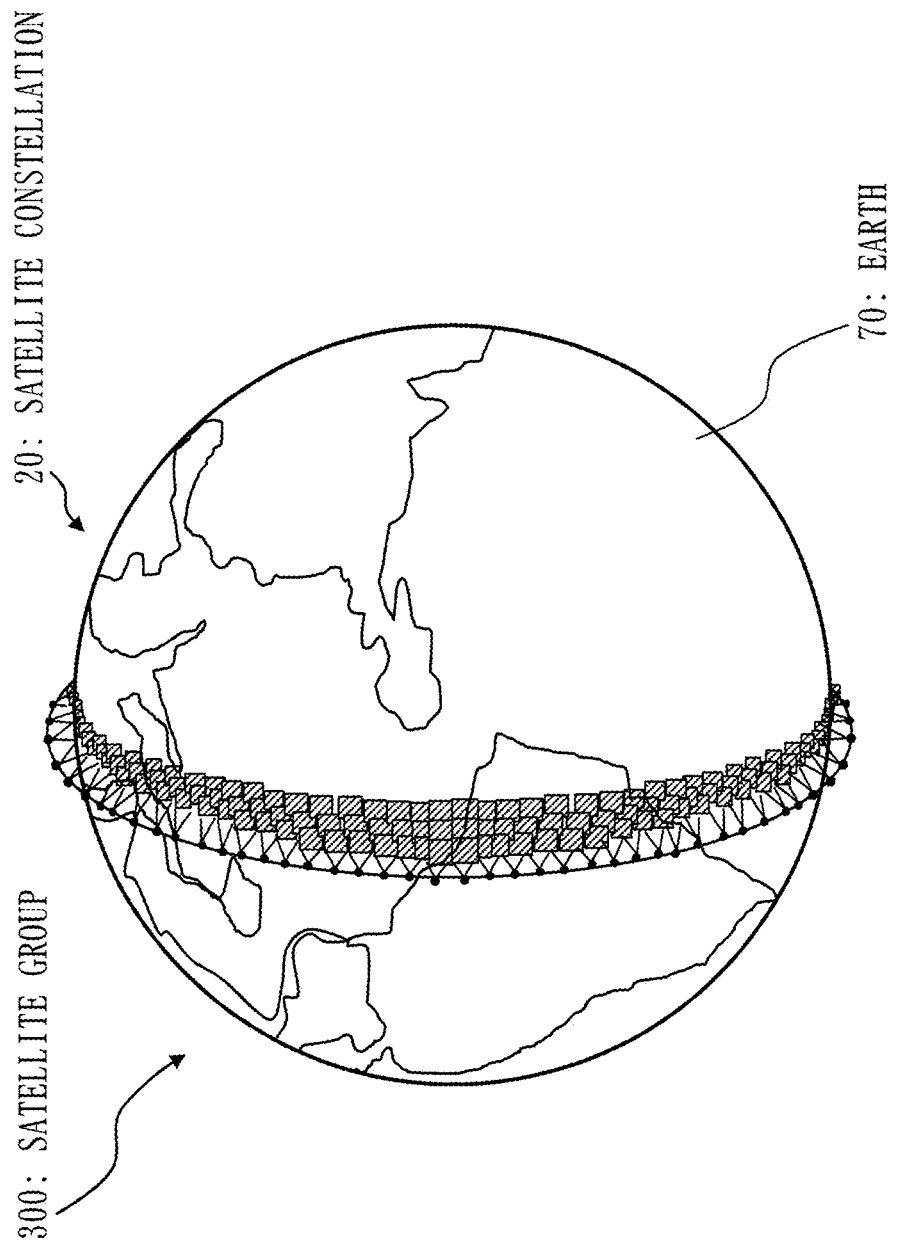
FIG. 2 is an example in which a plurality of satellites in a single orbital plane realize an Earth observation service.

FIG. 2 is a diagram illustrating an example in which an Earth observation service is realized by a plurality of satellites in a single orbital plane.

FIG. 2 illustrates a satellite constellation 20 that realizes an Earth observation service. In the satellite constellation of FIG. 2, satellites each equipped with an Earth observation device, which is an optical sensor or a radio sensor such as synthetic-aperture radar, fly at the same altitude in the same orbital plane. In this way, in a satellite group in which the ground imaging ranges of successive satellites overlap in a time-delay manner, a plurality of satellites in orbit provide an Earth observation service by capturing ground images in turn in a time-division manner. However, with the single orbital plane, a service can be provided only to the vicinity of an area directly below the orbit of the satellites. In contrast to this, if another orbital plane rotated in the east-west direction with respect to Earth is placed adjacently and a service by a plurality of satellites is similarly conducted concurrently, a ground service with widespread coverage between the adjacent orbits is possible. Similarly, by placing a large number of orbital planes at approximately equal intervals around Earth, an Earth observation service can be provided exhaustively over the entire globe. When seen from a specific point on the ground, each satellite flies away in a short period of time. However, if a plurality of satellites in orbit provide a service in turn in a time-division manner, an Earth observation service can always be provided to any given point on the ground.

In a typical observation satellite system, a satellite placed in a low Earth orbit (LEO) orbiting Earth is used to perform observation with an optical sensor, a radar sensor, or the like. Such a satellite is often launched into a sun-synchronous sub-recurrent orbit, and can perform observation while keeping the local solar time (LST) when passing the ascending node constant throughout the year. However, when a certain area on the ground is to be observed, a LEO satellite can only observe the area during a limited time period during which the satellite passes above the area. If the area needs to be observed for a long period of time, a large number, dozens to hundreds, of satellites need to be placed in the orbit.

There is known a stationary observation satellite system that uses a satellite placed in a geostationary orbit (GEO), like a weather satellite, to observe a predetermined area on the ground excluding the poles. However, a stationary orbit satellite of this type performs observation from a stationary orbit, so that monitoring is performed at a long distance from an orbital altitude of 36000 km. Furthermore, depending on the latitude, the elevation angle during observation becomes small, causing the resolution and sensitivity of an on-board imaging device to be insufficient.

There is also a method in which a satellite is placed in a medium Earth orbit (MEO). However, when a simple circular orbit is used, dozen or more satellites are required, depending on the orbital altitude.

A Molniya orbit is known as a method for observing a predetermined area on the ground including a high-latitude zone. The Molniya orbit is an elliptical orbit with a perigee altitude of 500 km and an apogee altitude of 40000 km. The Molniya orbit is the orbit with an orbital semi-major axis of 26600 km, thus completing two orbits around Earth per day. The orbital inclination is 63.4 degrees, so that the amount of movement due to perturbation of an argument of perigee is almost zero. By adopting such a Molniya orbit, the flight time above the high-latitude zone can be secured and the elevation angle during observation in the high-latitude zone can be prevented from decreasing. However, even if the Molniya orbit is used, the resolution decreases at the apogee. In addition, there are times with favorable observation conditions and times with unfavorable observation conditions throughout the year.

Description of Configurations

A satellite constellation forming system 100 according to this embodiment forms a satellite constellation 20 having N orbital planes with mutually different normal directions, where N is a natural number. Each orbital plane of the N orbital planes is an elliptical orbit having the same eccentricity and the same major axis.

The satellite constellation 20 formed by the satellite constellation forming system 100 according to this embodiment will be briefly described.

The satellite constellation 20 according to this embodiment is composed of a satellite group 300 made up of a plurality of satellites 30 in each orbital plane 21. In the satellite constellation 20 according to this embodiment, the satellite group 300 provides a service cooperatively. Specifically, the satellite constellation 20 refers to a satellite constellation composed of one satellite group provided by a communications service company as illustrated in FIG. 1. Specifically, the satellite constellation 20 refers to a satellite constellation composed of one satellite group provided by an observation service company as illustrated in FIG. 2.

Figure 3:
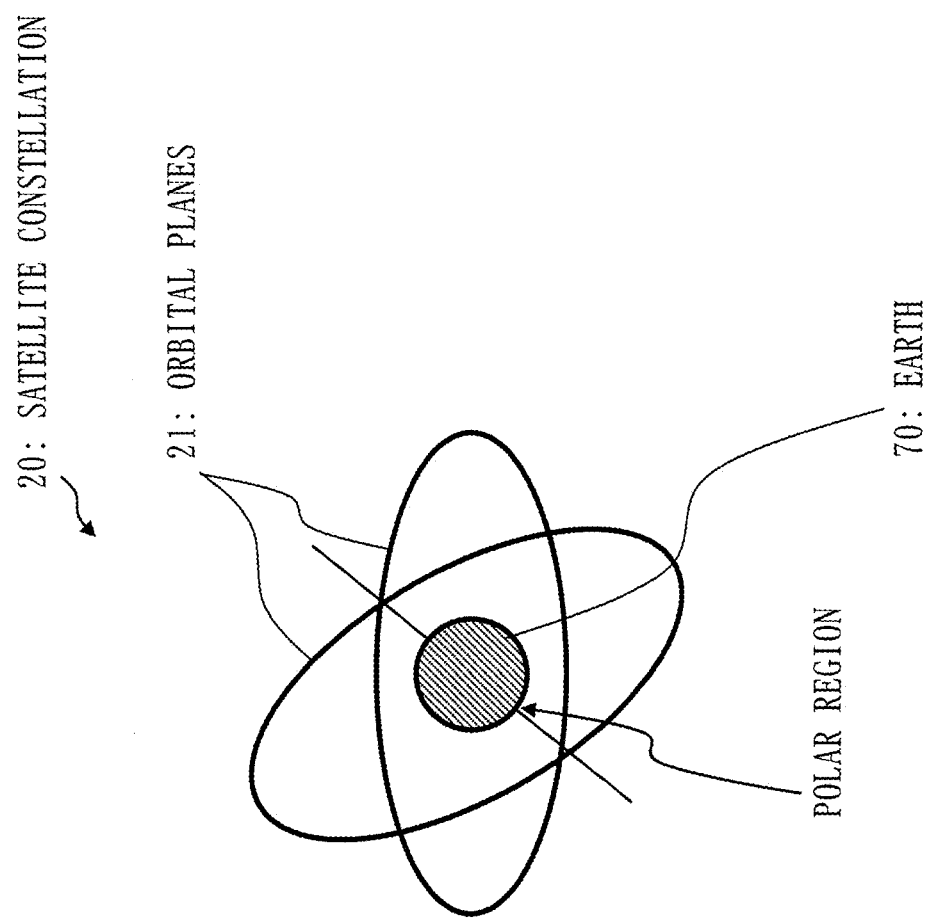
FIG. 3 is a schematic diagram illustrating an example of a satellite constellation according to Embodiment 1.
Figure 4:
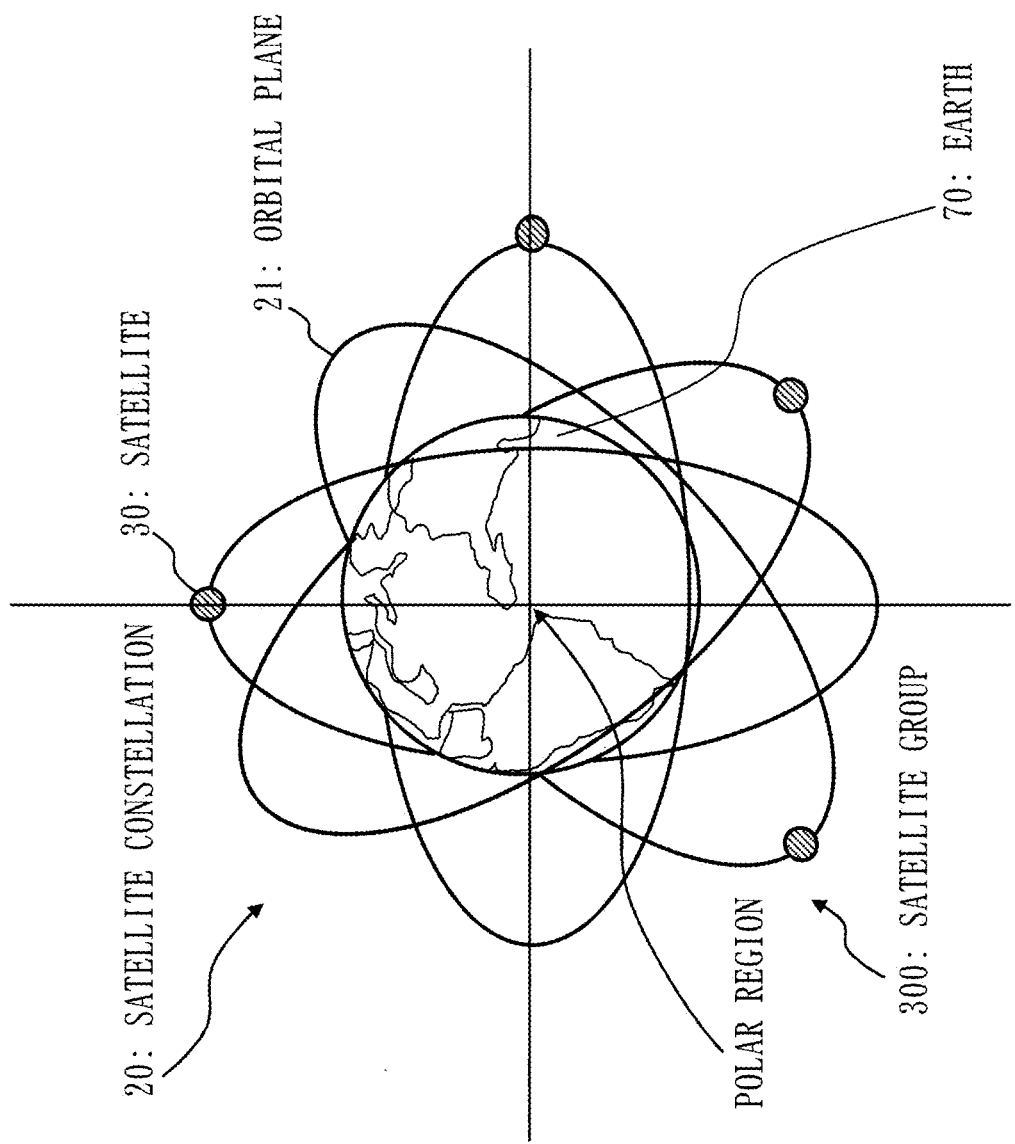
FIG. 4 is a schematic diagram illustrating an example of a satellite constellation according to Embodiment 1.

FIGS. 3 and 4 are schematic diagrams illustrating examples of the satellite constellation 20 according to this embodiment.

In FIG. 3, the orbital planes 21 in the satellite constellation 20 exist on mutually different planes. FIG. 3 illustrates an example in which the orbital inclination of each of the orbital planes 21 is approximately 90 degrees, but the orbital planes do not coincide with each other. That is, the orbital planes 21 intersect with each other. In FIG. 3, the orbital planes intersect with each other mainly in the vicinity of the polar regions. As an example, 20 or more satellites may fly as a plurality of satellites in each of the orbital planes 21. As an example, the satellite constellation 20 of FIG. 3 may have 20 or more orbital planes 21.

The satellite constellation 20 illustrated in FIG. 4 indicates an example in which the orbital inclination of each of the orbital plane 21 is not about 90 degrees, and the orbital planes 21 exist on mutually different planes. In FIG. 4, the orbital planes intersect with each other mainly in regions other than the polar regions.

The configuration of the satellite constellation 20 according to this embodiment will be described in detail later.

Figure 5:
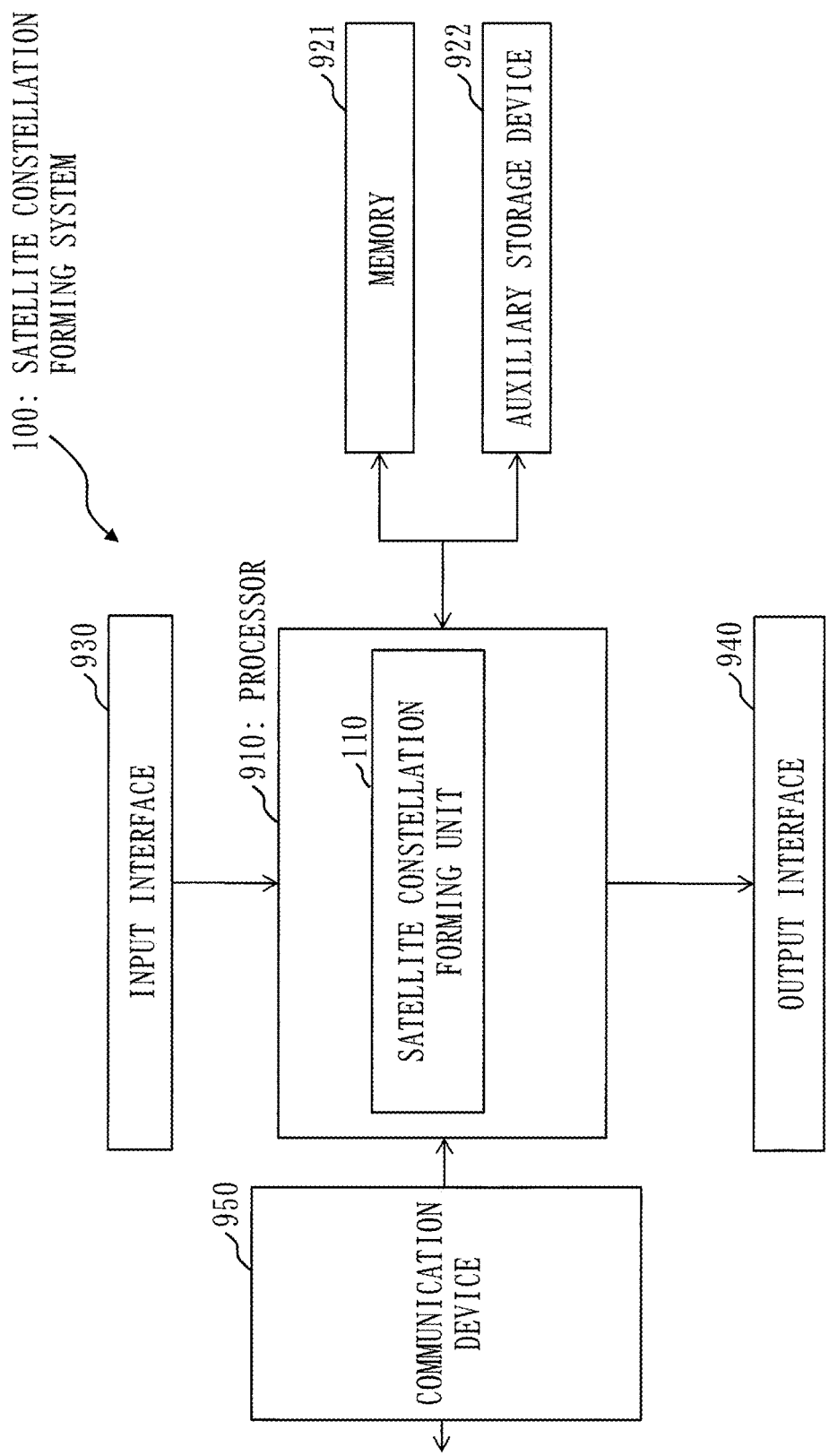
FIG. 5 is a configuration diagram of a satellite constellation forming system according to Embodiment 1.

FIG. 5 is a configuration diagram of the satellite constellation forming system 100 according to this embodiment.

The satellite constellation forming system 100 includes a computer. FIG. 5 illustrates the configuration with one computer. In actuality, a computer is included in each of the satellites 30 constituting the satellite constellation 20 and a ground facility that communicates with the satellites 30. The computers provided in each of the satellites 30 and the ground facility that communicates with the satellites 30 cooperatively realize the functions of the satellite constellation forming system 100 according to this embodiment. An example of a configuration of the computer that realizes the functions of the satellite constellation forming system 100 will be described below.

The satellite constellation forming system 100 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The satellite constellation forming system 100 includes a satellite constellation forming unit 110 as a functional element. The functions of the satellite constellation forming unit 110 are realized by hardware or software.

The processor 910 is a device that executes a satellite constellation forming program. The satellite constellation forming program is a program for realizing the functions of the satellite constellation forming unit 110.

The processor 910 is an integrated circuit (IC) that performs operational processing. Specific examples of the processor 910 are a CPU, a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In the satellite constellation forming system 100, communication between a ground facility 500 and the satellite 30 or inter-satellite communication is performed via the communication device 950.

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device. The satellite constellation forming program and the OS that are stored in the auxiliary storage device are loaded into the memory 921 and executed by the processor 910. Part or the entirety of the satellite constellation forming program may be embedded in the OS.

The satellite constellation forming system 100 may include a plurality of processors as an alternative to the processor 910. These processors share the execution of the satellite constellation forming program. Each of the processors is, like the processor 910, a device that executes the satellite constellation forming program.

Data, information, signal values, and variable values that are used, processed, or output by the satellite constellation forming program are stored in the memory 921 or the auxiliary storage device 922, or stored in a register or a cache memory in the processor 910.

"Unit" of the satellite constellation forming unit 110 may be interpreted as "process", "procedure", or "step". "Process" of the satellite constellation formation process may be interpreted as "program", "program product", or "computer readable storage medium recording a program".

The satellite constellation forming program causes a computer to execute each process, each procedure, or each step, where "unit" of the above satellite constellation forming unit is interpreted as "process", "procedure", or "step". A satellite constellation forming method is a method performed by execution of the satellite constellation forming program by the satellite constellation forming system 100.

The satellite constellation forming program may be stored and provided in a computer readable recording medium or storage medium. Alternatively, the satellite constellation forming program may be provided as a program product.

Figure 6:
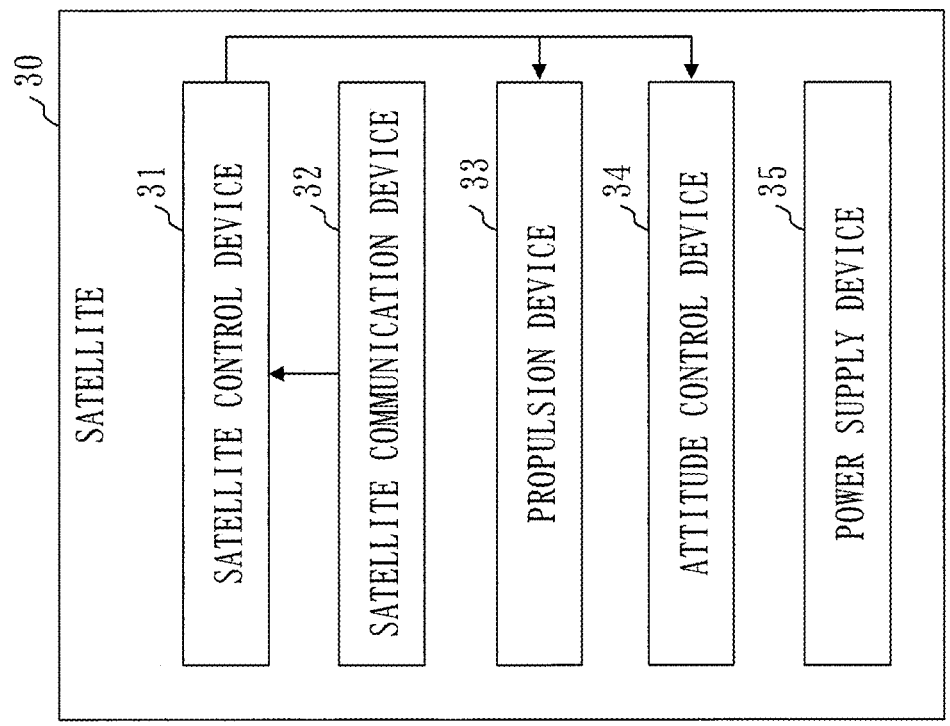
FIG. 6 is a configuration diagram of a satellite according to Embodiment 1.

FIG. 6 is a configuration diagram of the satellite 30 according to this embodiment.

The satellite 30 includes a satellite control device 31, the satellite communication device 32, a propulsion device 33, an attitude control device 34, and a power supply device 35.

The satellite control device 31 is a computer that controls the propulsion device 33 and the attitude control device 34, and includes a processing circuit. Specifically, the satellite control device 31 controls the propulsion device 33 and the attitude control device 34 in accordance with various commands transmitted from the ground facility 500.

The satellite communication device 32 is a device that communicates with the ground facility 500. Specifically, the satellite communication device 32 transmits various types of data regarding the satellite itself to the ground facility 500. The satellite communication device 32 receives various commands transmitted from the ground facility 500.

The propulsion device 33 is a device that provides thrust to the satellite 30 and changes the velocity of the satellite 30. Specifically, the propulsion device 33 is an electric propulsion device. Specifically, the propulsion device 33 is an ion engine or a Hall thruster.

The attitude control device 34 is a device to control attitude elements such as the attitude of the satellite 30 and the angular velocity and line of sight of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator according to measurement data of the attitude sensor or various commands from the ground facility 500.

The power supply device 35 includes equipment such as a solar cell, a battery, and an electric power control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit. FPGA is an abbreviation for Field Programmable Gate Array.

Figure 7:
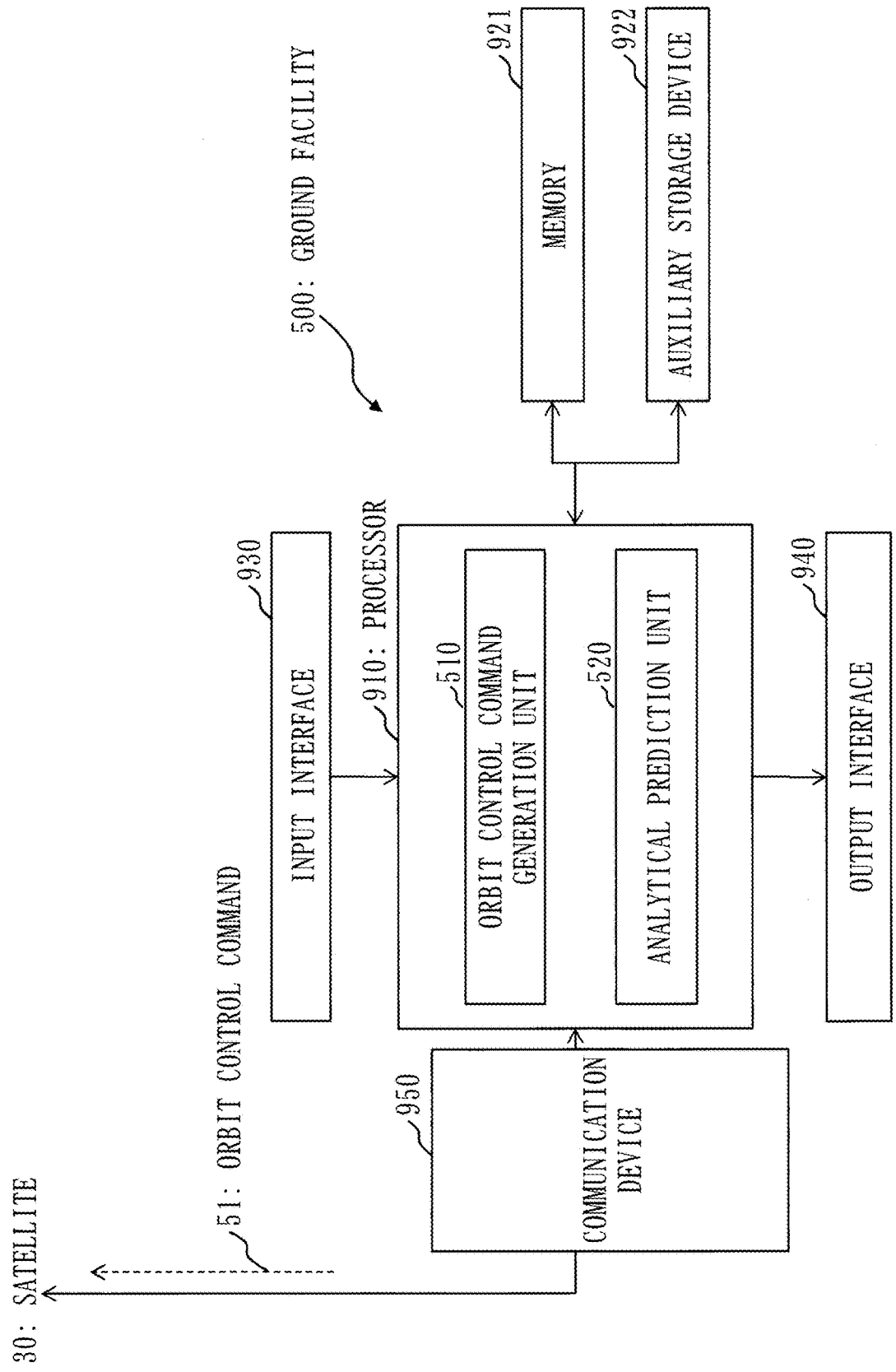
FIG. 7 is a configuration diagram of a ground facility according to Embodiment 1.

FIG. 7 is a configuration diagram of the ground facility 500 according to this embodiment.

The ground facility 500 controls a large number of satellites in all orbital planes by programs.

The ground facility 500 forms the satellite constellation 20 by communicating with each of the satellites 30. The ground facility 500 is provided in the satellite constellation forming system 100. The ground facility 500 includes a processor 910, and also includes other hardware components such as a memory 921, an auxiliary storage device 922, an input interface 930, an output interface 940, and a communication device 950. The processor 910 is connected with other hardware components via signal lines, and controls these other hardware components. The hardware components of the ground facility 500 are substantially the same as those described for the satellite constellation forming system 100 in FIG. 5. For simplicity of description, hardware components having substantially the same functions are denoted by the same reference sign. However, each system, satellite, device, or facility has its own hardware components.

The ground facility 500 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 51 to each satellite 30.

The analytical prediction unit 520 analytically predicts the orbit of the satellite 30.

Description of Functions

The satellite constellation forming system 100 according to this embodiment forms a satellite constellation 20 having orbital planes with mutually different normal directions. Each orbital plane of the orbital planes with mutually different normal directions is an elliptical orbit with the same eccentricity and the same major axis. Furthermore, an elevation direction of a major axis of each of the orbital planes has a crossing angle or a predetermined relative angle with respect to each other, and an azimuth direction of each of the orbital planes has a crossing angle or a predetermined relative angle with respect to each other. More specifically, this is as described below.

The satellite constellation forming system 100 according to this embodiment forms the satellite constellation 20 having N orbital planes with mutually different normal directions, where N is a natural number. Each orbital plane of the N orbital planes is an elliptical orbit with the same eccentricity and the same major axis. Furthermore, in this embodiment, the satellite constellation forming unit 110 forms the satellite constellation 20 in which each orbital plane of the N orbital planes is a polar orbit with an orbital inclination of about 90 degrees.

The satellite constellation forming unit 110 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other.

The ground facility 500 transmits an orbit control command 51 to satellites 30 constituting the satellite constellation having orbital planes with mutually different normal directions. As described above, the ground facility 500 includes the communication device 950 that transmits and receives signals for tracking and controlling the satellites 30. The orbit control command generation unit 510 of the ground facility 500 generates the orbit control command 51 to form the satellite constellation 20 in which each orbital plane of the orbital planes with mutually different normal directions is an elliptical orbit with the same eccentricity and the same major axis. Furthermore, this orbit control command 51 controls the orbits of the satellites 30 so that the elevation direction of the major axis of each of the orbital planes has a crossing angle or a predetermined relative angle with respect to each other, and the azimuth direction of each of the orbital planes has a crossing angle or a predetermined relative angle with respect to each other. More specifically, this is as described below.

In order to realize the functions of the satellite constellation forming unit 110 described above, the orbit control command generation unit 510 of the ground facility 500 generates the orbit control command 51 to be transmitted to the satellites 30. Specifically, the orbit control command generation unit 510 generates the orbit control command 51 to form the satellite constellation 20 in which each orbital plane of the N orbital planes is a polar orbit with an orbital inclination of 90 degrees, and each orbital plane of the N orbital planes is an elliptical orbit with the same eccentricity and the same major axis. Furthermore, this orbit control command 51 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other. The communication device 950 of the ground facility 500 transmits the orbit control command 51 to each satellite 30.

That is, the communication device 950 and the orbit control command generation unit 510 are examples of the satellite constellation forming unit 110.

Description of Operation

Figure 8:
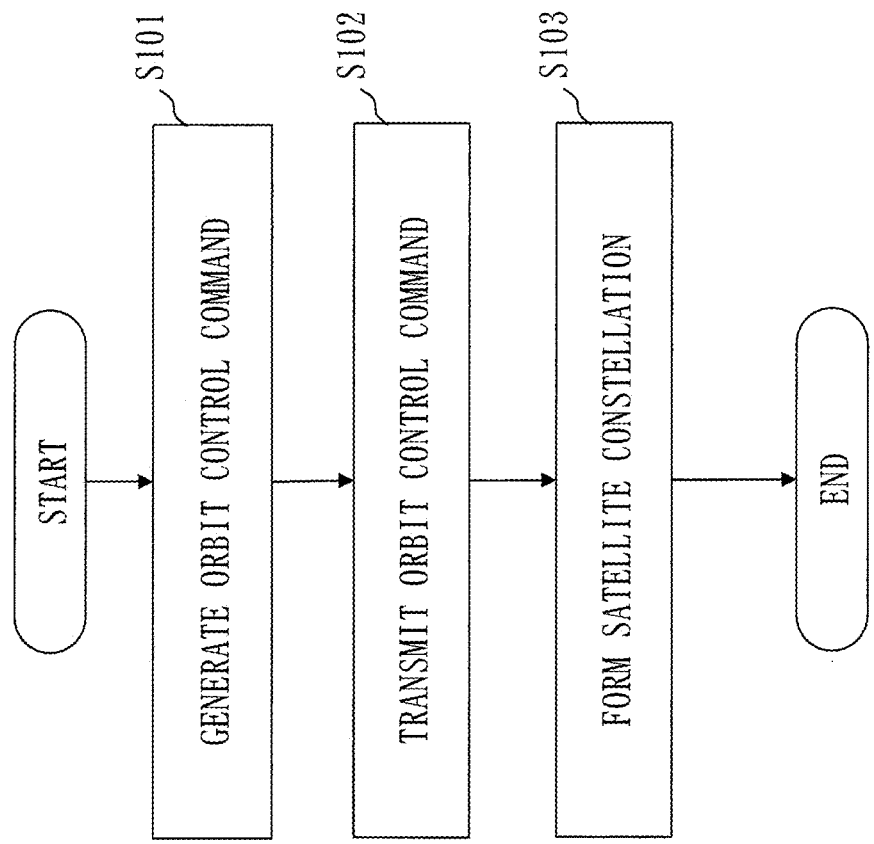
FIG. 8 is a flowchart of operation of the satellite constellation forming system according to Embodiment 1.

Referring to FIG. 8, operation of the satellite constellation forming system 100 according to this embodiment will be described. A procedure for the operation of the satellite constellation forming system 100 is equivalent to a satellite constellation forming method. A program that realizes the operation of the satellite constellation forming system 100 is equivalent to the satellite constellation forming program.

In step S101, the satellite constellation forming unit 110 generates parameters for forming a satellite constellation 20. The satellite constellation 20 has N orbital planes with mutually different normal directions, and each orbital plane of the N orbital planes is an elliptical orbit with the same eccentricity and the same major axis. In the satellite constellation 20, each orbital plane of the N orbital planes is a polar orbit with an orbital inclination of 90 degrees.

The satellite constellation forming unit 110 forms the satellite constellation 20 in which the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other. More specifically, the orbit control command generation unit 510 of the ground facility 500 generates an orbit control command 51 to be transmitted to each satellite 30 in order to form the satellite constellation 20 described above. The orbit control command generation unit 510 generates the orbit control command 51 so that the elevation direction of the major axis of each of the orbital planes has a relative angle of 360/N degrees with respect to each other, and the azimuth direction of each of the orbital planes has a relative angle of 180/N degrees with respect to each other.

In step S102, the satellite constellation forming unit 110 delivers the parameters for forming the satellite constellation 20 to each satellite 30.

Specifically, the communication device 950 of the ground facility 500 transmits the orbit control command 51 generated in order to form the satellite constellation 20 described above to each satellite 30.

In step S103, each satellite 30 controls the orbit and attitude in accordance with the parameters delivered from the satellite constellation forming unit 110. Specifically, the satellite communication device 32 of each satellite 30 receives the orbit control command 51 transmitted from the ground facility 500, and transmits it to the satellite control device 31. The satellite control device 31 of each satellite 30 controls the propulsion device 33 and the attitude control device 34 based on the orbit control command 51. Each satellite 30 controls the orbit in accordance with the orbit control command 51, thereby forming the satellite constellation 20.

Specific examples of the satellite constellation 20 according to this embodiment will be described below. In the satellite constellation 20 according to this embodiment, all orbital planes are elliptical orbits with the same eccentricity and the same major axis. The elevation direction angles of the major axes of the elliptical orbits have a relative angle of approximately 360/N degrees, and the azimuth directions have a relative angle of approximately 180/N degrees.

An object of this embodiment is to avoid a collision between satellites flying in a plurality of orbital planes. Therefore, an altitude difference between the apogee and the perigee should be a distance sufficient to avoid a collision. In the N orbital planes, the altitudes from the ground surface vary with rotation of the respective major axes.

Thus, with the apogee as the highest altitude and the perigee as the lowest altitude, the altitude difference is set so that satellites in the N−1 orbital planes can pass between these altitudes without a collision. For example, it is assumed that a satellite group has about 30 orbital planes (N=30). It is also assumed that relative orbit control accuracy in the satellite constellation forming system is about 10 m. In this case, a collision can be avoided by setting the altitude difference to about 300 m, and it is sufficient to set the altitude difference to about 1 km with a margin. For example, to set the altitude difference to 1 km in an orbital plane at an altitude of 500 km from the ground surface, if the eccentricity is set to about 0.00007, the apogee altitude is 500.5 km, the perigee altitude is 499.5 km, the semi-major axis from the center of Earth is about 6878.5 km, and the semi-minor axis is about 6877.5 km.

The ground speeds are different at the apogee and at the perigee, so that distances between satellites vary while a service is provided cooperatively by the satellite group. However, such variations will pose no problem for the service.

Figure 9:
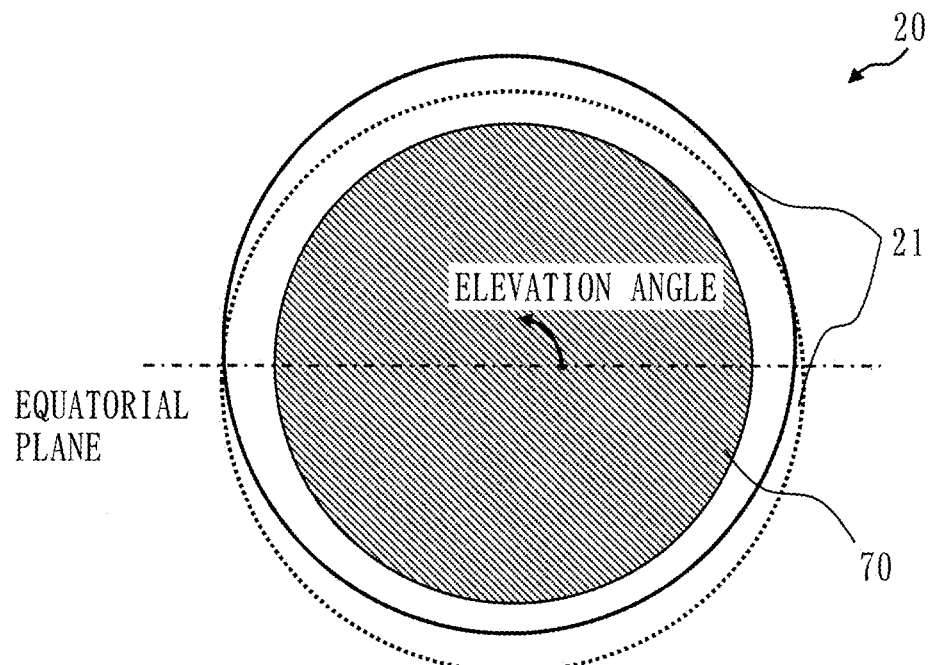
FIG. 9 is a diagram illustrating an example of two orbital planes in which elevation angles of elliptical orbits differ by 180 degrees in a satellite constellation according to Embodiment 1.

FIG. 9 is a diagram illustrating an example of two orbital planes 21 in which the elevation angles of elliptical orbits differ by 180 degrees in the satellite constellation 20 according to this embodiment.

In FIG. 9, the elevation direction of the major axis of each of the two orbital planes 21 has a relative angle of 180 (=360/2) degrees with respect to each other.

Figure 10:
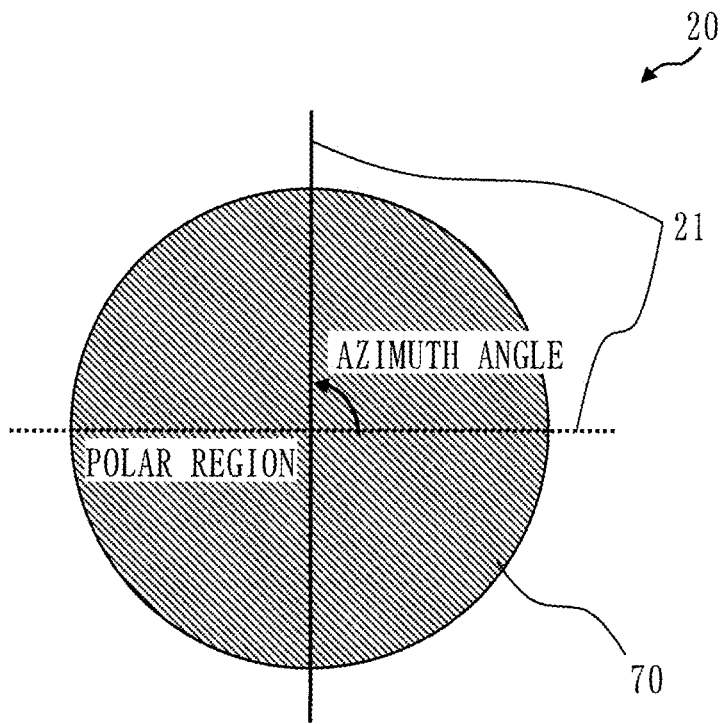
FIG. 10 is a diagram illustrating an example of two orbital planes in which azimuth angles differ by 90 degrees in a satellite constellation according to Embodiment 1.

FIG. 10 is a diagram illustrating an example of two orbital planes 21 in which the azimuth angles differ by 90 degrees in the satellite constellation 20 according to this embodiment.

In FIG. 10, the azimuth direction of each of the two orbital planes 21 has a relative angle of 90 (=180/2) degrees with respect to each other.

Figure 11:
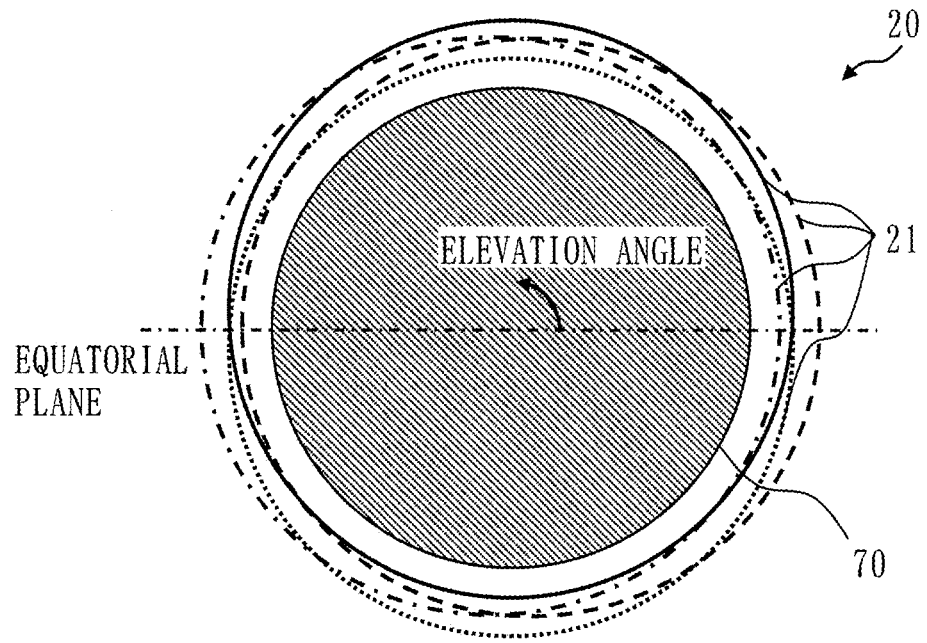
FIG. 11 is a diagram illustrating an example of four orbital planes in which elevation angles of elliptical orbits differ by 90 degrees in a satellite constellation according to Embodiment 1.

FIG. 11 is a diagram illustrating an example of four orbital planes 21 in which the elevation angles of elliptical orbits differ by 90 degrees in the satellite constellation 20 according to this embodiment.

In FIG. 11, the elevation angle of the major axis of each of the four orbital planes 21 has a relative angle of 90 (=360/4) degrees with respect to each other.

Figure 12:
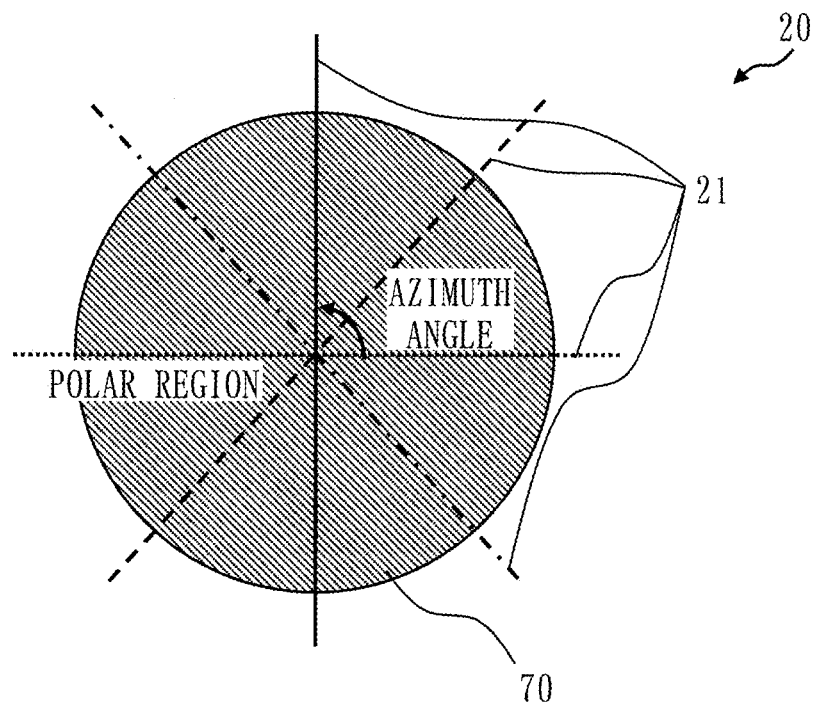
FIG. 12 is a diagram illustrating an example of four orbital planes in which azimuth angles differ by 45 degrees in a satellite constellation according to Embodiment 1.

FIG. 12 is a diagram illustrating an example of four orbital planes 21 in which the azimuth angles differ by 45 degrees in the satellite constellation 20 according to this embodiment.

In FIG. 12, the azimuth direction of each of the four orbital planes 21 has a relative angle of 45 (=180/4) degrees with respect to each other.

Description of Effects of this Embodiment

According to the satellite constellation forming system 100 of this embodiment, any given two orbital planes have no intersection point between them, so that there is no risk of a collision. Although the major axis of each elliptical orbit rotates in each orbital plane with passage of time, all the elliptical orbits have the same eccentricity and the same major axis, causing them to rotate in synchronization, so that the relative relationship is maintained.

Other Configurations

In this embodiment, the functions of the satellite constellation forming unit 110 are realized by software. As a variation, the functions of the satellite constellation forming unit 110 may be realized by hardware.

The satellite constellation forming system 100 includes an electronic circuit in place of the processor 910.

The electronic circuit is a dedicated electronic circuit that realizes the functions of the satellite constellation forming unit 110.

Specifically, the electronic circuit is a single circuit, a composite circuit, a programmed processor, a parallel-programmed processor, a logic IC, a GA, an ASIC, or an FPGA. GA is an abbreviation for Gate Array.

The functions of the satellite constellation forming unit 110 may be realized by one electronic circuit, or may be distributed among and realized by a plurality of electronic circuits.

As another variation, some of the functions of the satellite constellation forming unit 110 may be realized by the electronic circuit, and the rest of the functions may be realized by software.

Each of the processor and the electronic circuit is referred to also as processing circuitry. That is, in the satellite constellation forming system 100, the functions of the satellite constellation forming unit 110 are realized by the processing circuitry.

Embodiment 2

In this embodiment, differences from Embodiment 1 will be mainly described. Components that are substantially the same as those in Embodiment 1 are denoted by the same reference signs, and description thereof may be omitted.

Description of Configurations

In Embodiment 1, the satellite constellation forming unit 110 forms a satellite constellation 20 in which each orbital plane of N orbital planes is a polar orbit with an orbital inclination of 90 degrees. This embodiment describes a case in which the satellite constellation forming unit 110 forms a satellite constellation 20 in which each orbital plane of N orbital planes is an inclined orbit with an orbital inclination other than 90 degrees.

The configurations of the satellite constellation forming system 100, the satellite constellation 20, the ground facility 500, and the satellite 30 are substantially the same as those in Embodiment 1.

Description of Functions

The satellite constellation forming system 100 according to this embodiment forms a satellite constellation 20 having N orbital planes with mutually different normal directions. Each orbital plane of the N orbital planes is an elliptical orbit with the same eccentricity and the same major axis. Furthermore, in this embodiment, the satellite constellation forming unit 110 forms the satellite constellation 20 in which each orbital plane of the N orbital planes is an inclined orbit with an orbital inclination other than 90 degrees.

The satellite constellation forming unit 110 forms the satellite constellation 20 in which the elevation direction of the major axis of each of the orbital planes has a relative angle of 360/N degrees with respect to each other, and the azimuth direction of each of the orbital planes has a relative angle of 180/N degrees with respect to each other.

Specific examples of the satellite constellation 20 according to this embodiment will be described below. In the satellite constellation 20 according to this embodiment, all the orbital planes are elliptical orbits with the same eccentricity and the same major axis. Each of the orbital planes is an inclined orbit with an orbital inclination other than approximately 90 degrees. The elevation direction angles of the major axes of the elliptical orbits have a relative angle of approximately 360/N degrees, and the azimuth directions have a relative angle of approximately 180/N degrees.

Figure 13:
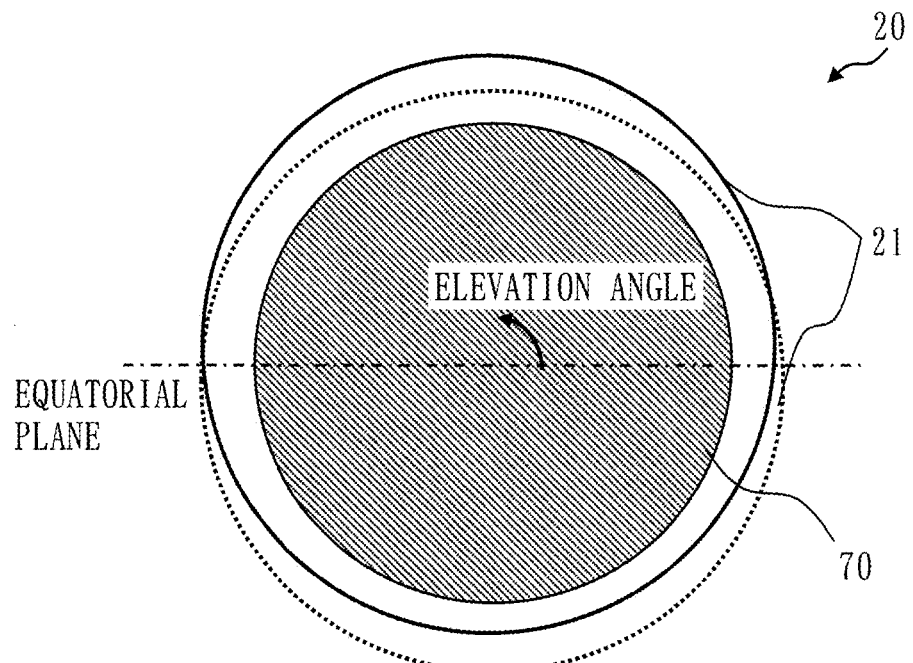
FIG. 13 is a diagram illustrating an example of two orbital planes in which elevation angles of elliptical orbits differ by 180 degrees in a satellite constellation according to Embodiment 2.

FIG. 13 is a diagram illustrating an example of two orbital planes 21 in which the elevation angles of elliptical orbits differ by 180 degrees in the satellite constellation 20 according to this embodiment.

In FIG. 13, the elevation direction of the major axis of each of the two orbital planes 21 has a relative angle of 180 (=360/2) degrees with respect to each other.

Figure 14:
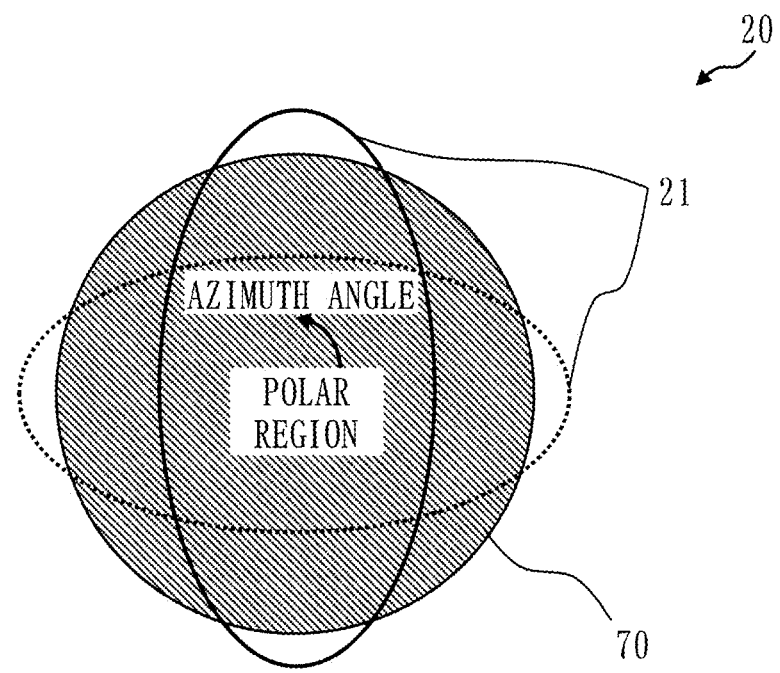
FIG. 14 is a diagram illustrating an example of two orbital planes in which azimuth directions differ by 90 degrees in a satellite constellation according to Embodiment 2.

FIG. 14 is a diagram illustrating an example of two orbital planes 21 in which the azimuth angles differ by 90 degrees in the satellite constellation 20 according to this embodiment.

In FIG. 14, the azimuth direction of each of the two orbital planes 21 has a relative angle of 90 (=180/2) degrees with respect to each other.

Figure 15:
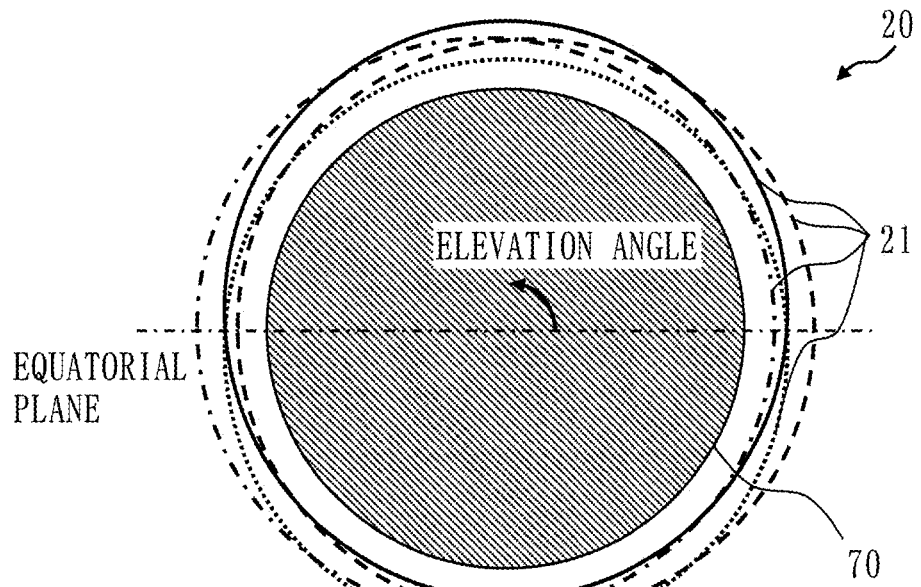
FIG. 15 is a diagram illustrating an example of four orbital planes in which elevation angles of elliptical orbits differ by 90 degrees in a satellite constellation according to Embodiment 2.

FIG. 15 is a diagram illustrating an example of four orbital planes 21 in which the elevation angles of elliptical orbits differ by 90 degrees in the satellite constellation 20 according to this embodiment.

In FIG. 15, the elevation direction of the major axis of each of the four orbital planes 21 has a relative angle of 90 (=360/4) degrees with respect to each other.

Figure 16:
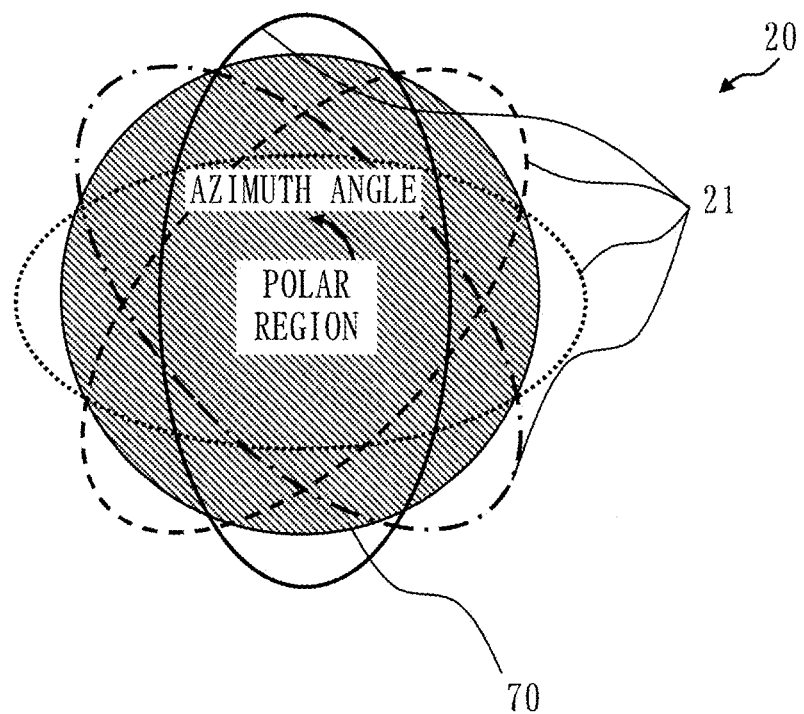
FIG. 16 is a diagram illustrating an example of four orbital planes in which azimuth angles differ by 45 degrees in a satellite constellation according to Embodiment 2.

FIG. 16 is a diagram illustrating an example of four orbital planes 21 in which the azimuth angles differ by 45 degrees in the satellite constellation 20 according to this embodiment.

In FIG. 16, the azimuth direction of each of the four orbital planes 21 has a relative angle of 45 (=180/4) degrees with respect to each other.

Description of Effects of this Embodiment

According to the satellite constellation forming system 100 of this embodiment, although two orbital planes may have an intersection point in a mid-latitude zone, it is easy to arrange that intersection passage timings of satellites passing through these orbital planes do not coincide with each other. Thus, there is an effect that a collision can be avoided.

Embodiment 3

In this embodiment, additions to Embodiments 1 and 2 will be mainly described. Components that are substantially the same as those in Embodiments 1 and 2 are denoted by the same reference signs, and description thereof may be omitted.

In this embodiment, an aspect will be described in which the satellite constellation forming system 100 forms a satellite constellation 20 in which major axes are arranged sequentially in the azimuth direction at equal intervals so that the apogees of N orbital planes are placed adjacently.

The configurations of the satellite constellation forming system 100, the satellite constellation 20, the ground facility 500, and the satellite 30 are substantially the same as those in Embodiment 1.

Figure 17:
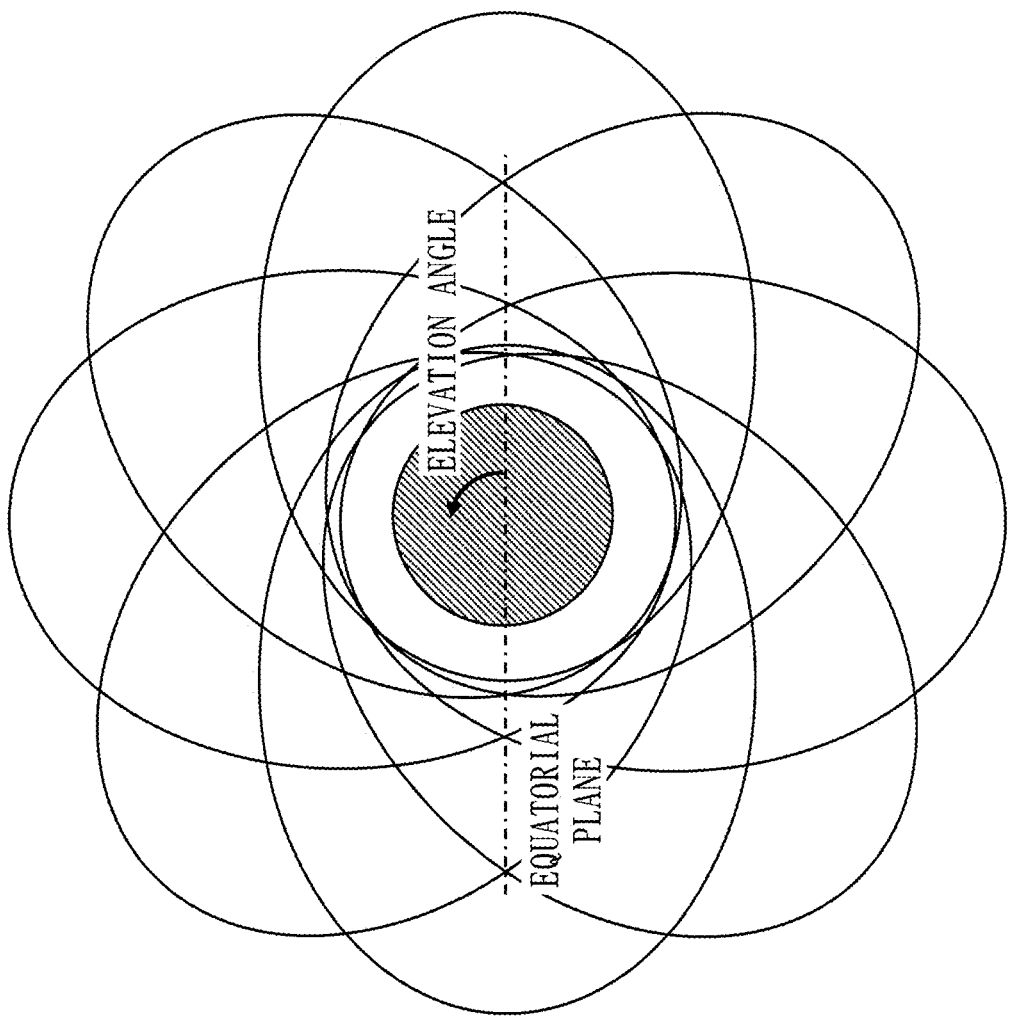
FIG. 17 is a diagram illustrating an example of eight orbital planes that are arranged by sequentially arranging adjacent major axes in a satellite constellation according to Embodiment 3.

FIG. 17 is a diagram illustrating an example of eight orbital planes that are arranged by sequentially arranging adjacent major axes in the satellite constellation 20 according to this embodiment.

In this embodiment, the satellite constellation forming unit 110 arranges the major axes sequentially in the azimuth direction at approximately equal intervals so that the apogees are placed adjacently. FIG. 17 is an exaggerated representation, and if the altitude difference between the apogee and the perigee is set to be sufficiently small, it will be indistinguishable when illustrated.

Description of Effects of this Embodiment

According to the satellite constellation forming system 100 of this embodiment, altitude differences between adjacent orbits are small, and the altitude differences widen gradually. Therefore, when inter-satellite communication is performed between satellites in adjacent orbits in order to conduct a communications service, for example, changes in the relative positions of the satellites due to differences in the ground speeds can be restrained to small changes, so that there is an effect that adverse influence on the service can be avoided.

The major axis of each orbital plane rotates with passage of time. Therefore, the relative high-low relationship in the altitude differences also changes accordingly with passage of time, so that changes in the relative positions due to differences in the ground speeds will cancel out over a long period of time. Even though there are differences in the altitudes of the orbital planes, the relative relationship between satellites is maintained on average over a long period of time, so that there is an effect that the service can be continued without a collision.

Embodiment 4

In this embodiment, additions to Embodiments 1 to 3 will be described. Components that are substantially the same as those in Embodiments 1 to 3 are denoted by the same reference signs, and description thereof will be omitted.

In this embodiment, the ground facility 500 for the satellite constellation forming system 100 for forming each of the satellite constellations 20 described in Embodiments 1 to 3 will be described.

The configurations of the satellite constellation forming system 100, the satellite constellation 20, the ground facility 500, and the satellite 30 are the same as those in Embodiment 1.

The ground facility 500 is provided in the satellite constellation forming system 100 described in any one of Embodiments 1 to 3. The ground facility 500 tracks and controls each satellite 30, and causes the propulsion device 33 included in each satellite 30 to operate so that the relative angles in the azimuth direction formed by the major axes of the orbital planes are maintained.

The communication device 950 of the ground facility 500 transmits and receives signals for tracking and controlling each satellite in an orbit satellite group 210 of each orbital plane of the orbital planes 21 constituting the satellite constellation 20.

The orbit control command generation unit 510 of the ground facility 500 generates an orbit control command 51 to form the satellite constellation 20 in which each of the orbital planes with mutually different normal directions is an elliptical orbit with the same eccentricity and the same major axis. Furthermore, the orbit control command 51 controls the orbits of the satellites 30 so that the elevation direction of the major axis of each of the orbital planes has a crossing angle or a predetermined relative angle with respect to each other and the azimuth direction of each of the orbital planes has a crossing angle or a predetermined relative angle with respect to each other. More specifically, this is as described below.

The orbit control command generation unit 510 of the ground facility 500 generates the orbit control command 51 to form the satellite constellation 20 in which each of N orbital planes 21 is an elliptical orbit with the same eccentricity and the same major axis. In the satellite constellation 20, the elevation direction of the major axis of each orbital plane of the N orbital planes has a relative angle of 360/N degrees with respect to each other, and the azimuth direction of each orbital plane of the N orbital planes has a relative angle of 180/N degrees with respect to each other.

The communication device 950 of the ground facility 500 transmits the orbit control command 51 to each satellite 30 in each of the orbital planes 21.

Description of Effects of this Embodiment

With the satellite constellation forming system 100 according to this embodiment, the ground facility 500 can be automated and labor can be saved.

Embodiment 5

In this embodiment, additions to Embodiments 1 to 4 will be described. Components that are substantially the same as those in Embodiments 1 to 4 are denoted by the same reference signs, and description thereof will be omitted.

The elliptical orbit described in Embodiments 1 to 4 may be a frozen orbit or a minimum space occupancy orbit (MiSO).

The minimum space occupancy orbit (MiSO) proposed by Bombardelli et al. in 2018 is a concept extended from the frozen orbit proposed by Cook in 1966.

The frozen orbit is an orbit in which orbital elements are selected so that average values of eccentricity and an argument of perigee (and inclination) are kept constant when a non-uniform gravitational field of a central celestial body is taken into account.

However, when influences of atmospheric drag, gravity from a third celestial body, and the like are taken into account in addition to the non-uniformity of the gravitational field, the shape of the frozen orbit changes with passage of time. In MiSO, the initial values of orbital elements are determined so that the volume of a three-dimensional space swept by the orbit is minimized.

MiSO reduces the amount of change in the orbit due to influences of natural disturbances, so that the frequency of satellites approaching each other is reduced. Thus, there is an effect that control for orbital maintenance can be reduced from the viewpoint of a probability of a collision.

In Embodiments 1 to 5 above, each unit of the satellite constellation forming system has been described as an independent functional block. However, the configuration of the satellite constellation forming system may be different from the configurations in the embodiments described above. The functional blocks of the satellite constellation forming system may be arranged in any configuration, provided that the functions described in the above embodiments can be realized. The satellite constellation forming system may be one device or may be a system composed of a plurality of devices.

A plurality of portions of Embodiments 1 to 5 may be implemented in combination. Alternatively, one portion of these embodiments may be implemented.

These embodiments may be implemented as a whole or partially in any combination.

That is, in Embodiments 1 to 5, each of the embodiments may be freely combined, or any constituent element of each of the embodiments may be modified, or any constituent element may be omitted in each of the embodiments.

The above embodiments are essentially preferable examples, and are not intended to limit the scope of the present invention, the scope of applications of the present invention, and the scope of uses of the present invention. Various modifications can be made to the above embodiments as necessary.

REFERENCE SIGNS LIST

20: satellite constellation, 21: orbital plane, 30: satellite, 31: satellite control device, 32: satellite communication device, 33: propulsion device, 34: attitude control device, 35: power supply device, 51: orbit control command, 70: Earth, 100: satellite constellation forming system, 110: satellite constellation forming unit, 300: satellite group, 500: ground facility, 510: orbit control command generation unit, 520: analytical prediction unit, 910: processor, 921: memory, 922: auxiliary storage device, 930: input interface, 940: output interface, 950: communication device.

The invention claimed is:

1. A satellite constellation forming system to form a satellite constellation having N orbital planes (N being a natural number excluding zero) with mutually different normal directions, the satellite constellation forming system comprising:
processing circuitry to output control signaling to form the satellite constellation in which each orbital plane of the N orbital planes is an elliptical orbit with a same shape in terms of at least a same eccentricity and a same length major axis,
wherein an elevation direction of the major axis of each said orbital plane of the N orbital planes has a relative angle of 360/N degrees with respect to each other, and
wherein an azimuth direction of each said orbital plane of the N orbital planes has a relative angle of 180/N degrees with respect to each other, to prevent or minimize collision of satellites travelling along respective ones of the N orbital planes, and
wherein the processing circuitry arranges the major axes of the N orbital planes sequentially in the azimuth direction at equal intervals so that apogees of the N orbital planes are placed adjacently.

2. The satellite constellation forming system according to claim 1, wherein the processing circuitry forms the satellite constellation in which each said orbital plane of the N orbital planes is a polar orbit with an orbital inclination of 90 degrees.

3. The satellite constellation forming system according to claim 2, wherein the elliptical orbit is a frozen orbit or a minimum space occupancy orbit (MiSO).

4. The satellite constellation forming system according to claim 2, wherein the elliptical orbit is a frozen orbit or a minimum space occupancy orbit (MiSO).

5. The satellite constellation forming system according to claim 1, wherein the processing circuitry forms the satellite constellation in which each said orbital plane of the N orbital planes is an inclined orbit with an orbital inclination other than 90 degrees.

6. The satellite constellation forming system according to claim 5, wherein the elliptical orbit is a frozen orbit or a minimum space occupancy orbit (MiSO).

7. The satellite constellation forming system according to claim 5, wherein the elliptical orbit is a frozen orbit or a minimum space occupancy orbit (MiSO).

8. The satellite constellation forming system according to claim 1, wherein the elliptical orbit is a frozen orbit or a minimum space occupancy orbit (MiSO).

9. A satellite constellation forming method of a satellite constellation forming system to form a satellite constellation having N orbital planes (N being a natural number excluding zero) with mutually different normal directions, the satellite constellation forming method comprising:
   outputting, using circuitry, control signaling to form the satellite constellation in which each orbital plane of the N orbital planes is an elliptical orbit with a same shape in terms of at least a same eccentricity and a same length major axis,
   wherein an elevation direction of the major axis of each said orbital plane of the N orbital planes has a relative angle of 360/N degrees with respect to each other,
   wherein an azimuth direction of each said orbital plane of the N orbital planes has a relative angle of 180/N degrees with respect to each other, and
   wherein said outputting the control signaling is such that the major axes of the N orbital planes are arranged sequentially in the azimuth direction at equal intervals so that apogees of the N orbital planes are placed adjacently.

10. The satellite constellation forming method according to claim 9, wherein the elliptical orbit is a frozen orbit or a minimum space occupancy orbit (MiSO).

11. A satellite constellation comprising N orbital planes (N being a natural number excluding zero) with mutually different normal directions, wherein
   each said orbital plane of the N orbital planes is an elliptical orbit with a same shape in terms of at least a same eccentricity and a same length major axis,
   wherein an elevation direction of the major axis of each said orbital plane of the N orbital planes has a relative angle of 360/N degrees with respect to each other,
   wherein an azimuth direction of each said orbital plane of the N orbital planes has a relative angle of 180/N degrees with respect to each other,
   wherein the N orbital planes are set so as to prevent or minimize collision of satellites travelling along respective ones of the N orbital planes, and
   wherein the major axes of the N orbital planes are arranged sequentially in the azimuth direction at equal intervals so that apogees of the N orbital planes are placed adjacently.

12. The satellite constellation according to claim 11, wherein the elliptical orbit is a frozen orbit or a minimum space occupancy orbit (MiSO).

13. A ground facility of a satellite constellation forming system to form a satellite constellation having N orbital planes (N being a natural number excluding zero) with mutually different normal directions, the ground facility comprising:
   a communication device to transmit and receive signals for tracking and controlling each satellite in a satellite group constituting the satellite constellation; and
   processing circuitry to generate an orbit control command to form the satellite constellation in which each orbital plane of the N orbital planes is an elliptical orbit with a same shape in terms of at least a same eccentricity and a same length major axis,
   wherein an elevation direction of the major axis of each said orbital plane of the N orbital planes has a relative angle of 360/N degrees with respect to each other,
   wherein an azimuth direction of each said orbital plane of the N orbital planes has a relative angle of 180/N degrees with respect to each other,
   wherein the communication device transmits the orbit control command to each said satellite of the satellite group, and
   wherein the processing circuitry arranges the major axes of the N orbital planes sequentially in the azimuth direction at equal intervals so that apogees of the N orbital planes are placed adjacently.

14. The ground facility according to claim 13, wherein the elliptical orbit is a frozen orbit or a minimum space occupancy orbit (MiSO).

15. A ground facility to transmit an orbit control command to a plurality of satellites constituting a satellite constellation having N orbital planes (N being a natural number excluding zero) with mutually different normal directions, the ground facility comprising:
   a communication device to transmit and receive signals for tracking and controlling each satellite of the plurality of satellites, and
   processing circuitry to generate an orbit control command to form the satellite constellation in which each orbital plane of the N orbital planes is an elliptical orbit with a same shape in terms of at least a same eccentricity and a same length major axis,
   wherein an elevation direction of the major axis of each said orbital plane of the N orbital planes has a relative angle of 360/N degrees with respect to each other,
   wherein an azimuth direction of each said orbital plane of the N orbital planes has a relative angle of 180/N degrees with respect to each other, and
   wherein the processing circuitry arranges the major axes of the N orbital planes sequentially in the azimuth direction at equal intervals so that apogees of the N orbital planes are placed adjacently.

16. The ground facility according to claim 15, wherein the elliptical orbit is a frozen orbit or a minimum space occupancy orbit (MiSO).

* * * * *